United States Patent [19]
Joshi

[11] Patent Number: 5,172,476
[45] Date of Patent: Dec. 22, 1992

[54] METHOD OF MANUFACTURING HEAT EXCHANGER TUBING

[75] Inventor: Shrikant M. Joshi, Cambridge, Mass.

[73] Assignee: General Motors Corporation, Detroit, Mich.

[21] Appl. No.: 744,863

[22] Filed: Aug. 14, 1991

[51] Int. Cl.$^5$ .............................................. B23P 15/26
[52] U.S. Cl. ................................. 29/890.053; 228/183
[58] Field of Search ..................... 29/890.049, 890.053, 29/890.05; 228/183; 165/173

[56] References Cited

U.S. PATENT DOCUMENTS

| | | | |
|---|---|---|---|
| 1,951,394 | 3/1934 | Chase et al. | 29/890.049 |
| 2,252,209 | 8/1941 | Schank et al. | 72/379.6 |
| 3,603,384 | 9/1971 | Huggins et al. | 29/890.049 |
| 4,558,695 | 12/1985 | Kumazawa et al. | 228/183 |

FOREIGN PATENT DOCUMENTS

| | | | |
|---|---|---|---|
| 0110435 | 6/1984 | Japan | 29/890.049 |
| 63-14091 | 1/1988 | Japan . | |

*Primary Examiner*—Irene Cuda
*Attorney, Agent, or Firm*—Patrick M. Griffin

[57] ABSTRACT

A condenser having single piece roll formed condenser tubes that are seam welded along an interfacing edge. The tube material is braze cladded on both sides for corrosion resistance and for high quality internal braze bonding of (1) longitudinal tube webs for optimizing burst strength, and (2) the tubes to associated air centers which are not cladded for an economical unit. The tubes can be readily made in a multiport or single port design by roll forming the longitudinal webs in each tube, and at discreet lengths along the tube length to provide a cut off area for sizing the tube and a smooth circumferential area where the tube enters the header providing a close fit and high quality brazed joints. This tube design provides material and cost advantage over the conventional extruded tubes and is readily fabricated using corrosion resistant alloys providing long service life. The number and spacing of the webs in this construction can be readily made by changing the number and spacing of the web forming rolls. The method provided by this invention provides increased output with higher machine speeds as compared to extrusion type processes.

2 Claims, 3 Drawing Sheets

METHOD OF MANUFACTURING HEAT EXCHANGER TUBING

TECHNICAL FIELD

This invention relates to heat exchangers, and more particularly to a new and improved heat exchanging condenser and condenser tubing for an air conditioning system, and to a new and improved method of making heat exchanger tubing.

BACKGROUND OF THE INVENTION

A condenser for an automotive air conditioner system generally comprises an aluminum tube and air center heat transfer unit that, in automotive installations, is preferably located forward of the engine coolant radiator. The condenser functions to cool the high pressure vapor forced from the compressor so that it condenses into a liquid state when air passes through the air centers of the condenser and around the tubes causing the vaporized refrigerant to condense into a high pressure liquid. The high pressure liquid cycling from the condenser is transmitted to the evaporator through an orifice that reduces the pressure liquid into a low pressure suitable for heat transfer operation when vaporizing and coursing through the thin walled tubes of the evaporator of the system as it cools the passenger compartment of the vehicle.

Prior to the present invention, condensers such as those having serpentined flow of the refrigerant use tube and air center construction in which tubes and centers are alternately stacked into a core. These tubes are generally extruded with thick and relatively heavy internal webs to provide high burst strength so that tubes will not rupture and leak from the from the pressure of the refrigerant supplied thereto by the compressor. Such webs also provide additional surface area on the refrigerant side for improving the performance of the condenser.

While such condensers have performed with good results, new condenser lighter weight constructions are needed to meet higher standards for heavy duty use using alloys which are form cladded to provide improved corrosion resistance, and extended service life, while having high burst strength. Also needed are designs that are lighter in weight and more economical to manufacture, and can be readily tailored into different configurations for varying heat exchanging character.

SUMMARY OF THE PRESENT INVENTION

This invention is drawn to a new and improved heat exchanger and to a method of making tubing therefor. More particularly, the present invention is drawn to a new and improved condenser and condenser manufacturing method.

This invention employs special condenser tubes that are protected against corrosion by rolling a base metal such as alloyed aluminum with an aluminum-silicon cladding of substantially uniform thickness to form rectilinear blanks. After the blanks are rolled, they are cut to length and rolled into tubes by suitable tube forming machinery and welded at an interfacing seam. The welded tube is subsequently rolled into an elongated ellipsoidal tube with flattened sides. After the basic tube is made, the sides are further roll formed using sets of adjustable rolls that can be set and spaced a predetermined distance from one another. When roll formed using these rolls, the flattened sides of the tubes have laterally spaced and elongated indentations or webs formed therein. These webs are subsequently internally brazed at their apices, or contact points, during the brazing of the condenser core in an oven. This braze connection can be made with individual tubes, if desired. Importantly, these webs are started and terminated at predetermined points between the opposite ends of each tube so cut off areas are provided, if needed, and annular and smooth connector ends remain for improved connection of the tubes to the headers or end walls of the tanks used in the condenser.

With this invention, the corrosion resistant cladding will not be stripped from the tubes as would be the case with extrusion or drawing the blanks through drawing dies that would result in the requirement for cladded air centers that are more expensive than air centers which are not cladded. Accordingly, in a preferred embodiment of the present invention, air centers which are not cladded, and are accordingly more economical are used. Since the tubes ar cladded on both side with aluminum-silicon that provide the simple eutectic with which aluminum forms with silicon good internal and external corrosion resistance is provided. By changing the roll spacing, web spacing can be varied to tailor the burst strength, as well as the heat exchanger operation of the heat exchanger of this invention. The ribs can be continuous or interrupted at predetermined points, as desired, to vary the flow through the condenser and tailor the heat exchanger characteristics thereof.

The roll formed tubes of this invention can be manufactured at a rate much faster than that of an extruded tube. This results in an increased output and reduced cost. Furthermore, the roll formed tube of this invention can be fabricated by using corrosion resistant "long life" alloys. Whereas these alloys cannot be extruded, and therefore, cannot be used in the conventional extruded tube design. In extrusions the number of webs in a tube design require new dies, whereas in this invention web change can be achieved by adjusting the spacing of rolls.

These and other features objects and advantages of this invention will become more apparent from the following:

DESCRIPTION OF THE PREFERRED EMBODIMENT

Figure 1:
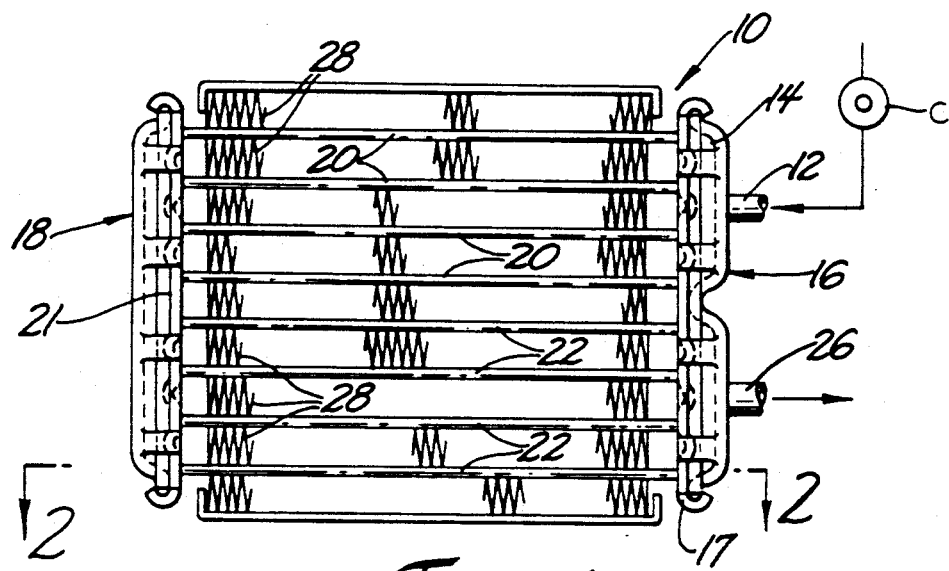
FIG. 1 is a front elevation view of an automotive air conditioner condenser.

Referring in greater detail to the drawings, there is shown in FIG. 1 a condenser 10 of an automotive air conditioning system which is an aluminum tube and air center heat transfer unit located forward of the engine coolant radiator. This condenser cools the refrigerant in the form of high pressure vapor piped thereto from the compressor of the air conditioning system in order that the refrigerant may condense into a liquid so that it can be transmitted in that phase to the evaporator through a pressure reducing orifice in the line between the condenser and the evaporator.

FIG. 1 also shows a condenser inlet pipe 12 leading from the compressor C into the first section of an end tank 16, the header plate 17 of which is operatively connected to an opposite end tank 18 by a first set of parallel spaced and flattened fluid flow tubes 20. Additionally, a second set of parallel spaced tubes 22, which are of the same construction as the tubes 20, connect the header plate 21 of tank 1B to the header plate 17 of a second section 24 of the end tank 16.

High pressure condensed refrigerant is discharged through a pipe 26 for delivery to a condenser through a pressure reducing orifice, which are not shown. Air centers 28 are brazed between tubes 20, 22, as shown.

Figure 3A:
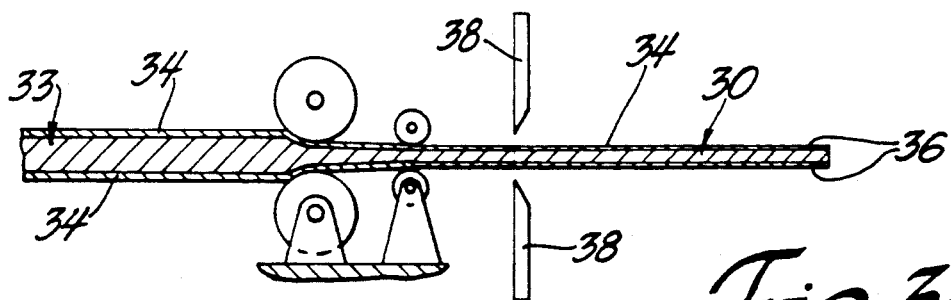
FIG. 3a is a diagram illustrating the rolling of cladded material into flattened cladded sheet metal blanks.
Figure 3B:
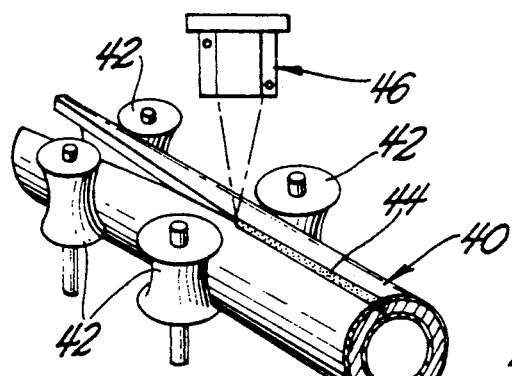
FIG. 3b is a diagram illustrating the curling of the flattened sheet metal blanks of FIG. 2a into a tube and the seam welding such tube.
Figure 3C:
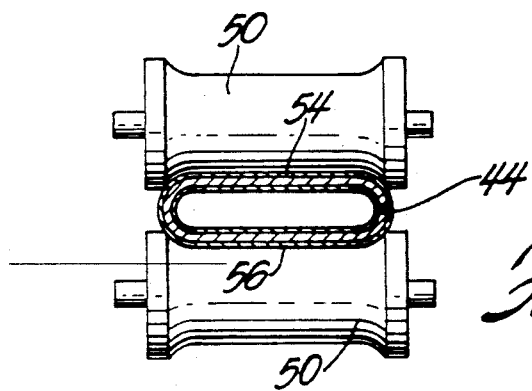
FIG. 3c is a diagram illustrating the rolling of the tubing of FIG. 3b into an oval tube for use in this invention.

In the preferred manufacture, as diagrammatically illustrated in FIG. 3a, flat blanks 30 are rolled from a base aluminum alloy stock 33 layered on both sides with aluminum-silicon cladding 34 of substantially uniform thickness. The rolled blanks 30, with cladding 34 of equal thickness on both sides, may be cut to size by knives 38 and rolled into cylindrical tubes 40 through sets of rollers 42 and seam welded at 44 by any suitable welder, such as electron beam welder 46. After the cylindrical tubes have been rolled and seam welded, they are fed through sets of spaced sets of rollers 50 to form elongated tubes 52 oval in cross section with flattened upper and lower sides 54 and 56, as best shown in FIGS. 3c.

Figure 3D:
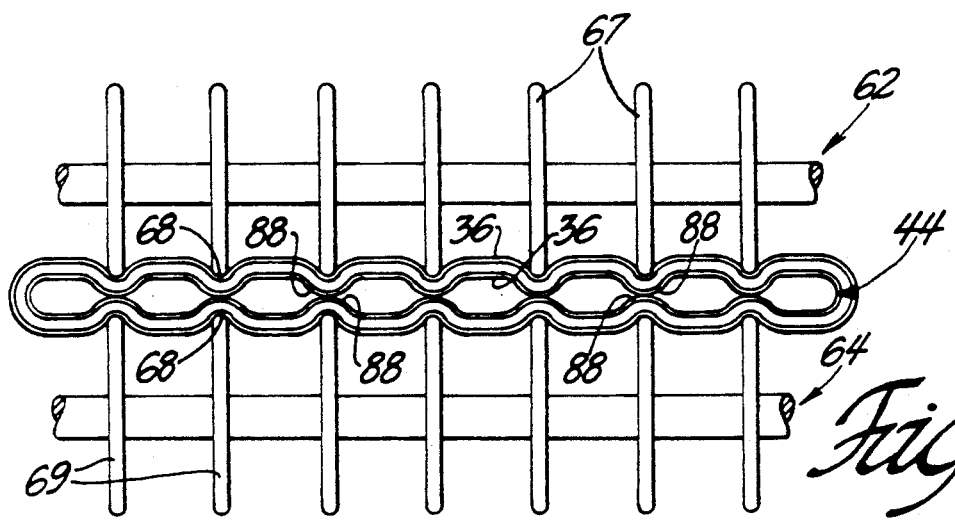
FIG. 3d is a diagram illustrating the rolling of webs in the tubing produced by the rolling operation of FIG. 3c.
Figure 4:
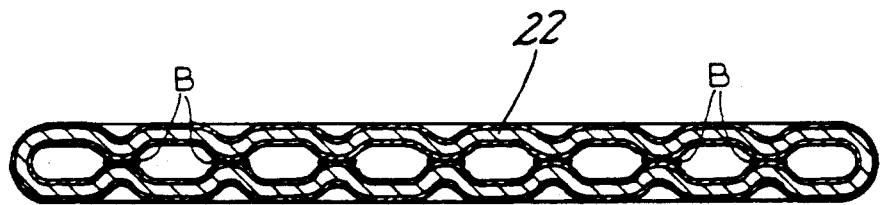
FIG. 4 is a sectional view taken along sight ines 4—4 of FIG. 3.
Figure 5:
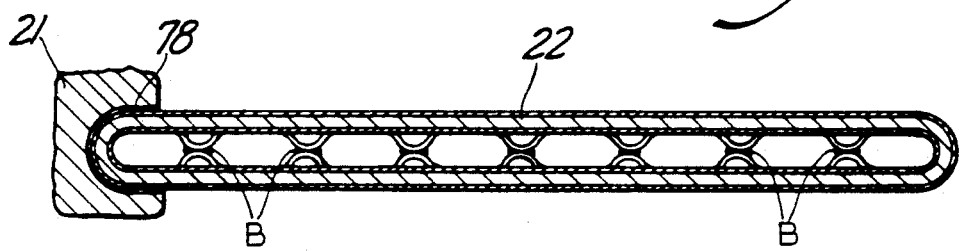
FIG. 5 is a cross sectional view with parts broken away taken along sight lines 5—5 of FIG. 2.

Subsequently, each of the oval tubes 52 is fed between adjustable sets of roll assemblies 6 and 4 having disc like rolls 67 and 69 adjustably set and spaced at equal and predetermined distances from each other and in axial alignment, such as shown in FIG. 3d. The rolls may be provided with collars and set screws, not shown, for adjustment on their associated drive shafts.

Figure 2:
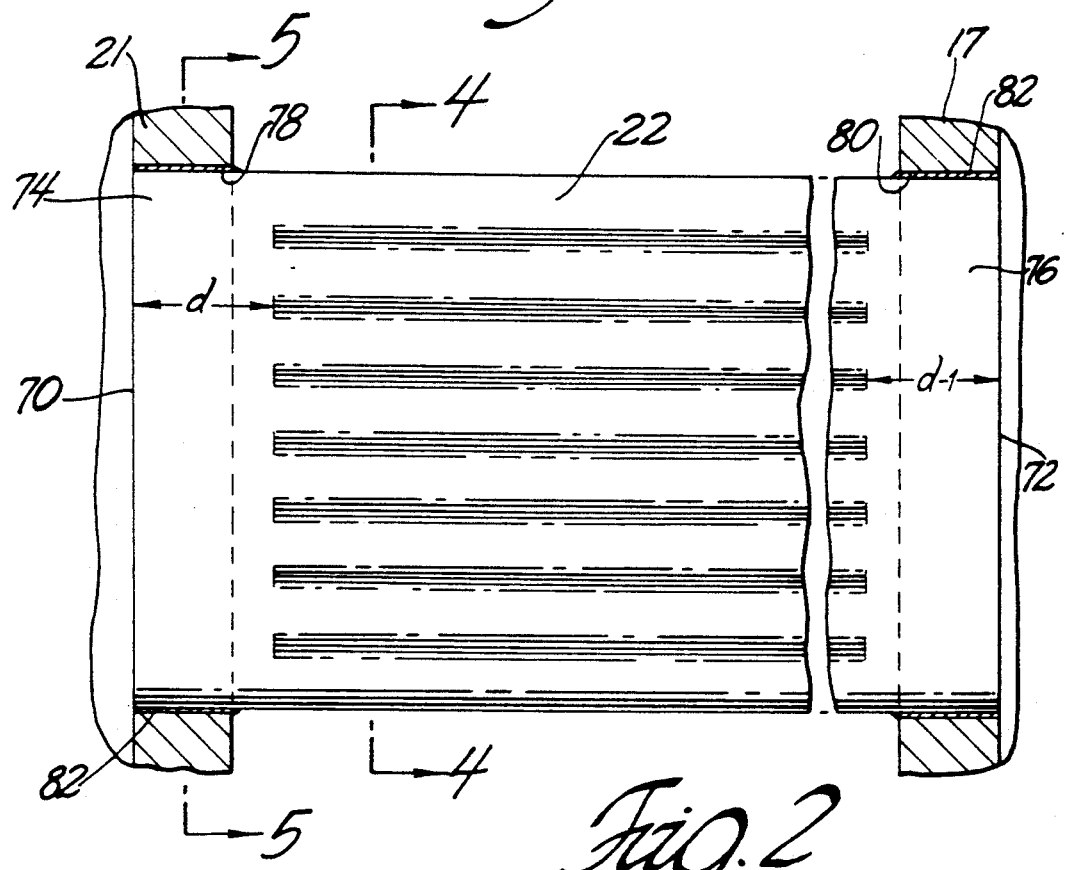
FIG. 2 is a view partially in section and with parts broken away taken generally along sight lines 2—2 of FIG. 1.

The tubes are fed into the roll assemblies 62, 64 and starting at a predetermined distance, distance d from the end of the tube, the rolls are moved into a spaced distance from one another and the tube is fed therethrough to deform portions of the flattened sides of each of the tubes with elongated parallel channels or webs 68. These webs are preferably continuous and extend from their starting points spaced a predetermined distance from the leading edge of the tube to a predetermined stopping points short of the terminal end of the tube. With this construction, smooth and continuous peripheral end areas 74, 76 of widths d, d-1 are provided and opposite ends 70, 72 of the rolled tubes can be cut to appropriate length, if needed. The continuous smooth peripheral surfaces 74, 76 can be readily inserted into the closely matching openings 78 and 80 of the header plates of the tanks. As illustrated best in FIG. 2, this close fit, which is easily made, provide an initial connection so that the brazing material 82 is readily sweated into the joint to provide a fluid tight connection. Accordingly, a smooth and continuous annular brazed fluid-tight seal is made when the tubes are assembled into the header plates and suitably clamped and brazed in an oven.

The rolls 67 can be positionally adjusted on their rotatable support shafts to vary their spacing or additional rolls added to change the spacing of the webs or increase the number of webs to meet design requirements.

Figure 6:
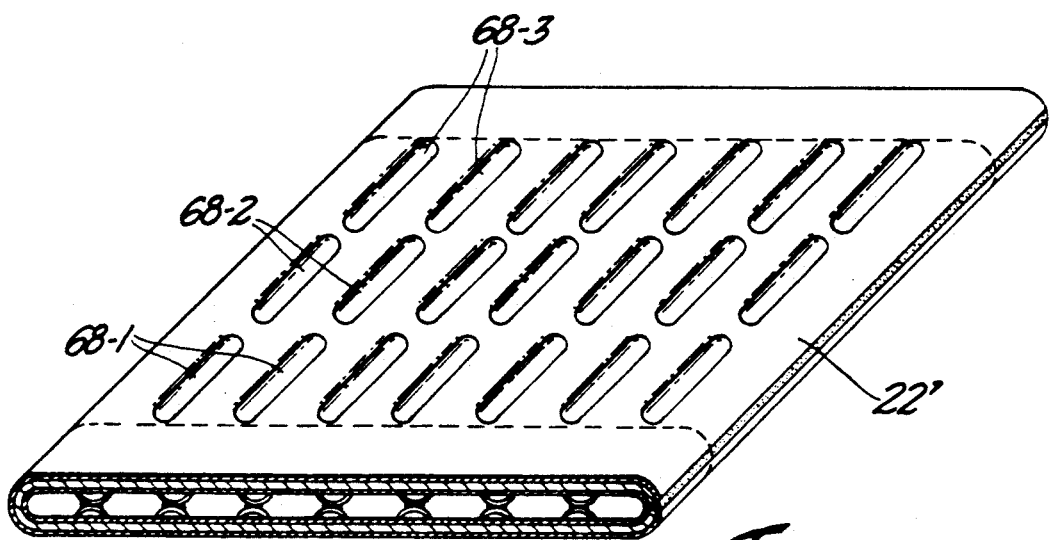
FIG. 6 is a pictorial view of one of the tubes provided by this invention having parallel interrupted grooves or webs formed therein extending from a connector section at one end to a connector section at the other end.

In addition to the brazed annular connection to the header plates, the internal walls of each of the webs is firmly brazed along the lengths of the species at 88 with brazing material diagrammatically shown at B so that there is improved burst strength of the tubes. Furthermore, the interior of each individual passage in each tube is cladded with an even layer of cladding 36 to provide corrosion protection from the refrigerant being condensed in this unit. If desired, the webs of the tubes can be selectively interrupted along their lengths, as shown in tube 22' at 68-1, 68-2, 68-3 in FIG. 6, to provide a variation in flow pattern during condenser operation. As in the first embodiment, the tube webs add additional heat transfer surface area for the fluid flowing through the tube, and accordingly, heat transfer performance is improved.

With this invention, the air centers 28 do not require cladding as would be the case with conventional units which have extruded drawn tubes that would remove some or all cladding from the tubes being formed.

With this invention, other modification can be made employing the principles and teaching of the disclosure herein. It is therefore the intent of this specification to illustrate preferred embodiments of the invention, and the invention to be limited to the scop of the following claims.

I claim:

1. A method of making a tube for a heat exchanger comprising the steps of:
   providing a sheet of aluminum base material, cladding said sheet of material with a coating of aluminum-silicone cladding material of a substantially constant thickness on the upper and lower sides thereof,
   forming said cladded sheet into a blank having predetermined dimensions with elongated side walls,
   roll forming said blank into a partial tube so that said side walls closely interface one another,
   welding said interfacing side walls along the length thereof to one another to form a tube,
   partially flattening said tube so that it is oval shaped substantially throughout its length in cross section with substantially flattened upper and lower sides,
   forming said tube so that it has a predetermined length,
   roll forming opposing flattened upper and lower side sections of said tube intermediate the ends thereof to have a plurality of generally U-shaped webs therein and that have interior apices which are closely adjacent to one another,
   providing a brazing material to said interior of said tube between the adjacent apices of said channels,
   clamping said tube so that said apices are sufficiently close to one another and so that the brazing material will be effective to seal said interfacing apices to one another during a subsequent brazing operation, placing said tubes in an oven and heating said oven until said interfacing apices are brazed together to form a plurality of separate passages in said tube.

2. The method of making the tube defined in claim 1 above, wherein said roll forming said tubes is initiated at a predetermined point spaced from the first end of said tube and is subsequently terminated at a point spaced from another end of said tube thereby leaving end portions free of said channels to enable said tubes to be readily inserted into oval shaped openings in said header plates and readily brazed thereto.

* * * * *